March 31, 1959  W. V. SEIP ET AL  2,879,822
TIRE CHAIN FASTENER
Filed Dec. 3, 1956
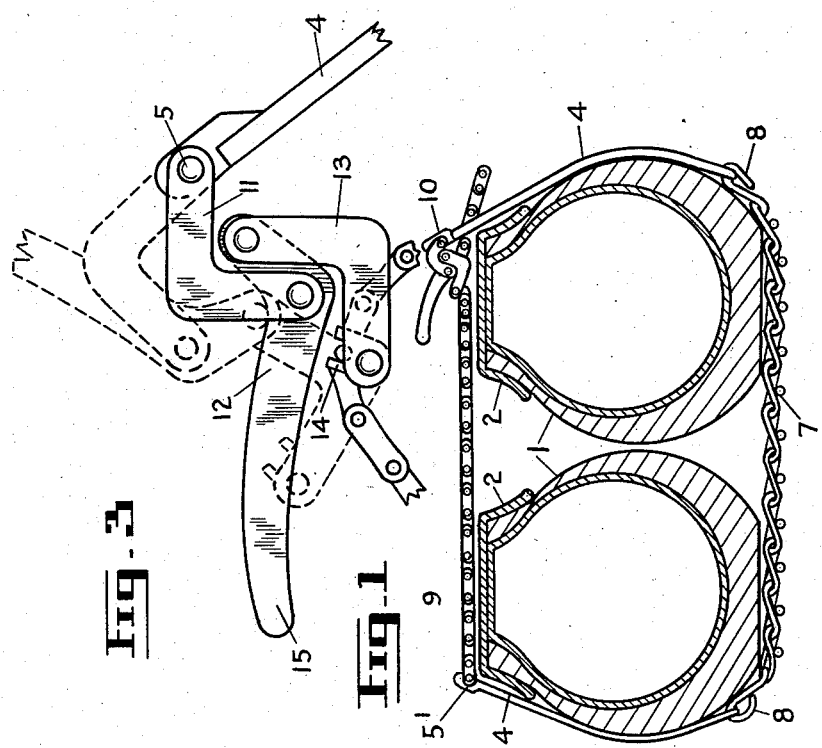
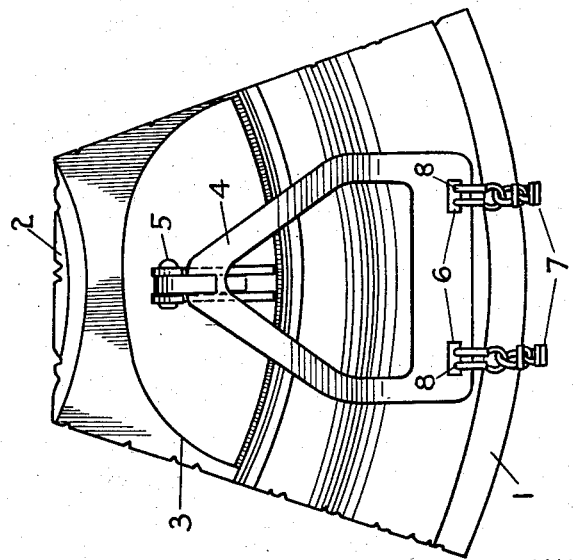
INVENTOR
Walter V. Seip and Arthur
H. Cherry
Ralph Burch
Attorney

United States Patent Office 2,879,822
Patented Mar. 31, 1959

2,879,822

TIRE CHAIN FASTENER

Walter Valentine Seip, South Burnaby, British Columbia, and Arthur Harold Cherry, New Westminster, British Columbia, Canada Application December 3, 1956, Serial No. 626,051

1 Claim. (Cl. 152—237)

This invention has as its primary object the provision of an emergency traction device to be applied to motor vehicle wheels. On occasions where motor vehicles have to be operated on routes comprising sections of mud, snow, sand etc., it is desirable to have a readily and easily attachable means which will provide the necessary traction when required. Known tire chains which purport to achieve this object have fastening devices which lack the necessary features of strength, wide range of application, compactness and simplicity of manufacture.

It is therefore an object of this invention to provide such a tire chain, adequately strong in design to permit usage on heavy vehicles normally having dual driving wheels, yet being readily adaptable to all vehicles.

It is a further object to provide such a tire chain with a fastener of the toggle type, but specially contained for the particular application keeping in mind the necessity for robustness and simplicity, robustness in view of the rough treatment it must take, and simplicity for ease in production and operation.

It is also an object of this invention to provide a tire chain with fastener means capable of a substantial tightening movement or take up, both in the initial adjustment and in the final fastening or locking action.

With these objects in view, the following description discloses an embodiment of the invention for use with heavy vehicles having dual driving wheels, but it is understood that it is quite within the scope of the invention to apply the novel features herein disclosed to chains for single wheels.

In the accompanying drawings:

Fig. 1 is a cross section showing the tire chain applied to dual wheels;

Figure 2 is a part elevation of the wheels with attached chain;

Figure 3 is an enlarged view of the fastening device in open and closed position.

Referring to the drawings in detail, the vehicle tires 1, are mounted on the usual pressed steel wheels 2, having several apertures 3, spaced around the periphery. The tire chain embodies identical end plates 4, of generally triangular form and shaped to the curve of the tire side. At the apex of the triangle is pivot 5, for attachment of the fastening members, and spaced on the base of the triangle are holes 6, for the attachment of the traction chains 7. These chains can be of any preferred form, those illustrated being the popular cross bar link type. The attachment for traction chains 7, comprises lock-like links 8, which are easily removed and replaced when it is necessary to shorten chain 7, by removal of one or more links. Sprocket chain 9 is the adjusting member of the fastening means, and is attached to one end plate at pivot point 5'. Attached to the corresponding pivot point on the opposite end plate is the self locking toggle device generally shown at 10.

In detail, the toggle lock comprises link 11, made of two identical L-shaped members pivotally attached to end plate 4, bell crank lever 12 pivotally attached to link 11 and link 13 which has generally the same construction as link 11, but has a fixed sprocket chain engaging member 14 at one extremity. The bell crank lever 12 has a long arm forming a handle 15.

To apply the novel tire chain to a vehicle wheel, chain 9 is fed through the wheel apertures 3 and engaged with chain engaging member 14, so that upon operation of handle 15 of the bell crank lever 12 in the locking direction, the take up of the toggle action will result in the necessary tightening of the tire chain as a whole. As will be obvious from the drawings, the toggle action makes attachment 10 self locking under load, with handle 15 serving the further purpose of locking chain 9 in member 14. Also obvious is the fact that the tire chain can be removed very quickly upon operation of handle 15 to both lessen the tension and release chain 9.

It will be seen that the invention now fully disclosed, overcomes the disadvantages of previous tire chains and is readily adaptable to vehicle wheels of many types.

The embodiments of the invention in which an exclusive property or privilege is claimed are defined as follows.

I claim:

In a tire chain fastener, the combination with a traction chain having plates at each end, of a sprocket chain extending between the plates having one end pivotally attached to one of the plates, an L-shape link having the end of one of its arms pivotally attached to the other plate, a bell crank lever pivotally connected to the end of the other arm of said link having a long and short arm with the short arm disposed within the angle of said link, a second L-shape link having the end of one arm pivotally connected to the end of the short arm of said bell crank lever and the other arm disposed between said sprocket chain and the long arm of said lever, and a chain engaging member fixedly attached to the end of said last-mentioned arm of said second link for releasable engagement with said sprocket chain.

References Cited in the file of this patent

UNITED STATES PATENTS

| | | |
|---|---|---|
| 2,453,426 | Freed | Nov. 9, 1948 |
| 2,500,488 | Durbin et al. | Mar. 14, 1950 |

FOREIGN PATENTS

| | | |
|---|---|---|
| 387,140 | Great Britain | Feb. 2, 1933 |
| 83,120 | Sweden | Apr. 9, 1935 |